Sept. 8, 1959 J. R. OISHEI Re. 24,697

COMBINED ELECTRIC WINDSHIELD CLEANER AND WASHER

Original Filed Feb. 12, 1954 2 Sheets-Sheet 1

INVENTOR.
John R. Oishei
BY
Beau, Brooks, Buckley & Beau,
ATTORNEYS.

COMBINED ELECTRIC WINDSHIELD CLEANER AND WASHER

Original Filed Feb. 12, 1954 2 Sheets-Sheet 2

INVENTOR.
John R. Oishei
BY
Beau, Brooks, Buckley & Beau,
ATTORNEYS.

United States Patent Office

Re. 24,697
Reissued Sept. 8, 1959

24,697

COMBINED ELECTRIC WINDSHIELD CLEANER AND WASHER

John R. Oishei, Buffalo, N.Y., assignor to Trico Products Corporation, Buffalo, N.Y.

Original No. 2,870,476, dated January 27, 1959, Serial No. 409,837, February 12, 1954. Application for reissue February 9, 1959, Serial No. 792,237

7 Claims. (Cl. 15—250.4)

Matter enclosed in heavy brackets [ ] appears in the original patent but forms no part of this reissue specification; matter printed in italics indicates the additions made by reissue.

This invention relates to a windshield cleaning system, and more particularly to a mechanism for *automatically* coordinating the actions of a windshield washer and *electric* wiper in order to insure a clean dry field of vision through the windshield.

Devices to coordinate the wiper and washer actions are relatively commonplace *in the prior patent art.* For the most part, such devices *would* have proven to be unsatisfactory for a variety of reasons. In many, the wiper action subsides substantially simultaneously with that of the washer, leaving a damp shield. This condition is detrimental to vision and also leads to the rapid accumulation of dirt and grime, causing the shield to become [obliterated] *obscured* a short time after its last cleaning. In others, although the wiper action is prolonged beyond that of the washer, such prolongation is carried out without regard to the rate of oscillation of the wipers, leading to a lacking of uniformity in the results of the cleaning cycle. Additionally, the various coordinating devices *in the prior art but not* now in common use are relatively complex, difficult to assemble and install, and expensive to manufacture.

Accordingly, it is the primary object of the instant invention to provide [a] *an automatic electric* coordinator, simple in structure and mode of operation, which times the cleaning cycle in accordance with the number of strokes of the *electric* wiper so as to make uniformly clean results obtainable at all times.

An additional object of the invention is to provide a device which will permit the continuation of *electric* wiper action for a predetermined number of strokes after the termination of washer operation so as to insure a dry shield, and then automatically park the wipers.

*A further object of the invention is to coordinate an electric windshield cleaner with a windshield washer, the arrangement embodying automatically operable coordinating mechanism that includes a timing mechanism for providing an interval of conjoint windshield cleaning action of the wiper and washer, using switch means comprising two electric circuits for initiating the conjoint wiper and washer operation, one of the circuits being operable selectively for use of the wiper mechanism alone.*

For a better understanding of these and other objects of the invention, reference is made to the following specifications and accompanying drawings wherein:

Fig. 5 is a view taken on line V—V of Fig. 3; while,

Figure 1:
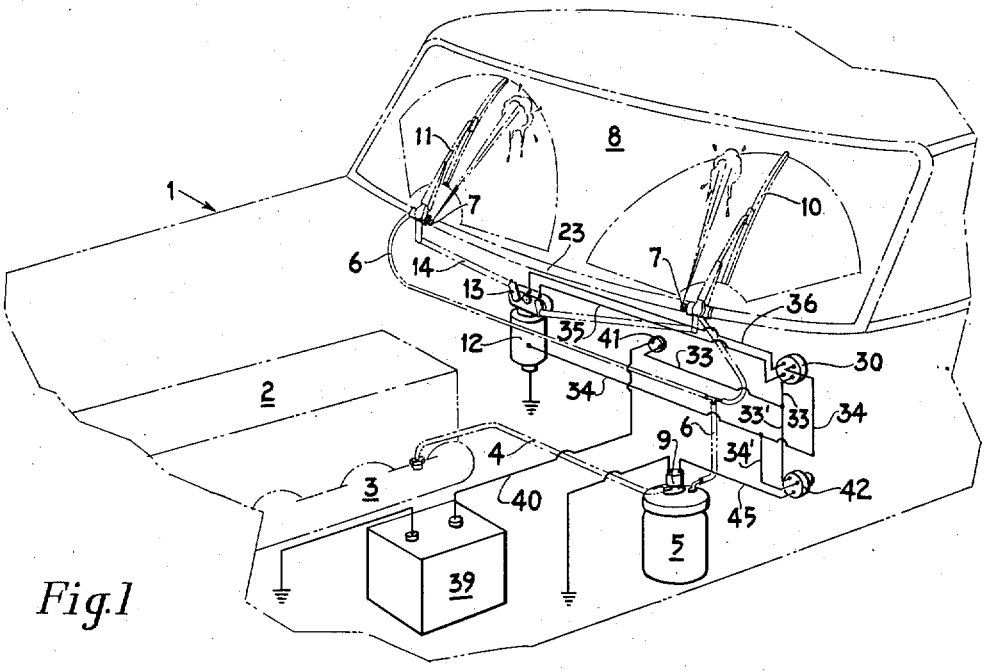
Fig. 1 is a diagrammatic view of an automotive vehicle equipped with a coordinator system constructed in accordance with the instant invention, and employed in conjunction with an electromagnetically actuated washer.

Referring now more particularly to the drawings, the numeral 1 generally designates an automotive vehicle having an engine 2 with an intake minafold 3. Conduit 4 interconnects the manifold and electromagnetically activated washer 5, while conduit 6 leads from the washer to nozzles 7 located proximate to the windshield 8 of the vehicle. Activation of solenoid 9 results in the intercommunication of the washer and intake manifold so as to create a pressure differential in the former, ultimately causing the impingement of jets of liquid solvent upon the windshield. The above described structure forms no part of the instant invention, and for a more detailed description of its internal operation, resort may be had to application Serial No. 323,902, filed on December 3, 1952, by John R. Oishei for a Windshield Washer, now Patent No. 2,746,652, issued May 22, 1956.

Figure 5:
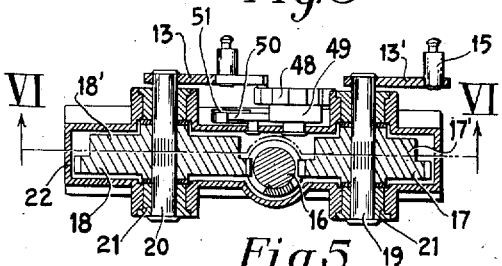

Squeegees 10 are oscillated over the surface of the windshield by the usual spring pressed wiper arms 11 which derive their motion from motor 12 via crank arms 13 and 13', and connecting rods 14 which are mounted on wrist pins 15 of the cranks. The motor may be of the conventional electrical variety having a worm 16 drivingly coupled to the armature shaft. The worm engages gears 17 and 18 which as best seen in Fig. 5 are in the ratio of 4:5 with respect to one another. The gears are fixedly mounted on driveshafts 19 and 20 which are journalled in bearings 21 located in protruding bosses on switch box casing 22. The aforementioned crank arms 13 and 13' are mounted on the extremities of the drive shafts, exteriorly of the casing. The gears are dissimilar in size in order to keep the squeegees out of phase during the wiping operation and so maintain a substantially constant torque load on motor 12. A detailed discussion of the advantages of out of phase wiper operation is contained in application Serial No. 317,049, filed by Erwin C. Horton on October 27, 1952, for an Electric Windshield Cleaner, now Patent No. 2,691,789, issued October 19, 1954.

Since the wipers are out of phase during the greater portion of the wiping operation, a unique switching system must be resorted to in order to conveniently park the squeegees proximate to molding 23 at the termination of the operation. The switch comprises a terminal 24 mounted on the upper surface of casing 22 and having flutter bar 25 pivotally mounted thereon. The flutter bar may be of spring steel and underlies contact 26 and terminal 27. Bus bar 28 which is insulated from terminal 24 by rubber washer 29 connects contact 26 and terminal 27. Cams 17' and 18' are cast integral with gears 17 and 18, and are so arranged that the low portions of their peripheries will be uppermost when their associated squeegees arrive at the parking position of the wiping cycle. Cam followers 17'' and 18'' are urged into contact with the periphery of the cams by the resilient flutter bar, and cause said bar to flex upwardly when the high portion of the cams are uppermost. As the rate of rotation of the cams is in a 4:5 ratio, it should be noted that the flexing of the opposite sides of the flutter bar by followers 17'' and 18'' will for the most part be out of synchronism.

Figure 9:
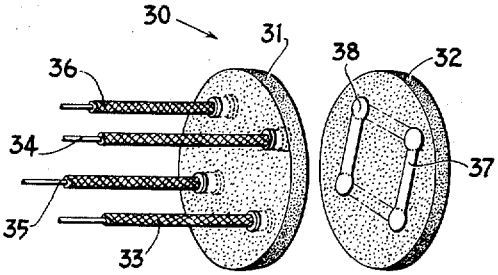

Referring now more particularly to Fig. 9, the manually operable wiper motor control switch 30 which is of the rotary type comprises two discs 31 and 32 which may be fabricated of any rigid, non-conducting material. Disc 31 contains four contact points spaced apart so as to define the four corners of a square. Each of leads 33, 34, 35 and 36 is individually connected to its respective contact point. Bus bars 37 and 38, each of a size equal to a side of the square defined by the contact points are fixed to the surface of disc 32 and spaced apart thereon a distance equal to a side of the aforementioned square. When the switch is assembled, the two discs are held in contiguous relationship by the housing which has been omitted from the drawing for purposes of simplicity.

If it is desired to utilize the wipers, the operator of the vehicle rotates disc 32 until the bus bars are in the position illustrated by the solid lines in Fig. 9. This completes a circuit commencing at battery 39 and containing lead 40, normally closed ignition switch 41, lead 33, bus bar 37, lead 34 and motor 12. From the motor the current passes to ground and back to the battery. When it is desired to park the blades, the operator rotates disc 32 ninety degrees in either direction so as to place the bus bars in the position shown in phantom in Fig. 9. The motor circuit now comprises battery 39, lead 40, ignition switch 41, lead 33, one of bus bars 37 and 38, lead 35, terminal 27, the flutter switch, terminal 24, lead 36, the other of bus bars 37 and 38, lead 34 and motor 12. The motor will continue to run for so long as the flutter switch remains closed.

Figure 6:
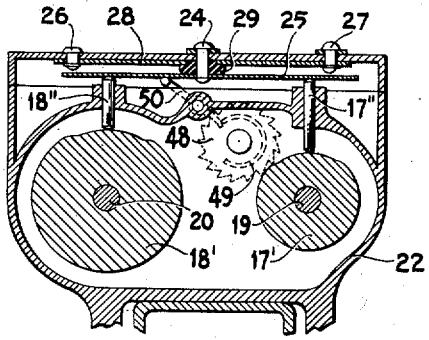
Fig. 6 is a view taken on line VI—VI of Fig. 5.

Assuming the wiper motor control switch was rotated to the "off" position when the squeegee associated with cam 18' was in the parked position, while the squeegee associated with cam 17' was at some other point in its wiping cycle. Under these circumstances, follower 18'' will be riding on the low portion of cam 18' while follower 17'' will be on the high portion of cam 17' forcing flutter bar 25 into engagement with terminal 27. The current would therefore flow from lead 35 into terminal 27, across the flutter bar to terminal 24 and out into lead 36. At a later point in the cycle, the squeegee associated with cam 17' will arrive at its parked position while the squeegee associated with cam 18' will be at some other location. Now the conditions are reversed and follower 17'' is riding on the low portion of its cam while follower 18'' is on the high portion, forcing flutter bar 25 into engagement with contact 26. The current will therefore flow from lead 35 into terminal 27, across bus bar 28 to contact 26, across the flutter bar to terminal 24 and out into lead 36. If neither squeegee happens to be in the parked position, both followers will be riding on the high portions of their respective cams so as to force the flutter bar into engagement with terminal 27 as well as contact 26. As a result, the current will divide, part following each of the paths described above between leads 35 and 36. When both squeegees are simultaneously in the parked position, the cams and followers will assume the position illustrated in Fig. 6 with neither contact 26 nor terminal 27 in engagement with the flutter bar. The circuit is therefore open and the motor will stop running at the exact instant both squeegees are in their parked position. It should be noted that the above sequence of operations occur automatically upon the rotation of the motor control switch to its "off" position. There is no need for the operator to await a specific point in the cycle before rotating the switch.

Figure 8:
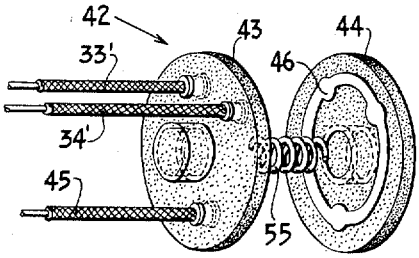
Fig. 8 is an exploded view showing the salient elements of the coordinator control switch; and, Fig. 9 is an exploded view showing the salient elements of the wiper motor control switch.
Figure 7:
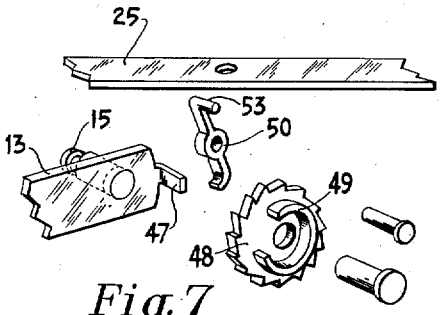
Fig. 7 is an exploded view of the coordinator.

Referring now more particularly to Fig. 8, the manually operable coordinator control switch 42 which is of the push-pull variety comprises two discs 43 and 44 which may be fabricated of any rigid non-conducting material. Disc 43 contains three contact points spaced apart so as to define the apices of an equilateral triangle. Each of leads 33', 34' and 45 is individually connected to its respective contact point. Conductor 46 which is substantially ring shaped and of a size sufficient to circumscribe the triangle defined by the above mentioned contacts is fixed to the surface of disc 44. Spring 55 having its ends located in the guides provided therefor in the discs normally urges the latter apart and into engagement with the opposing end walls of the housing which has been omitted from the drawing for purposes of simplicity.

If it is desired to utilize the washer, the operator merely depresses disc 44 until conductor 46 engages the contact points and then releases the disc permitting the spring to return it to the normal open position. This momentarily completes an electrical circuit commencing at battery 39 and including lead 40, normally closed ignition switch 41, leads 33 and 33', conductor 46, lead 45 and solenoid 9. From the solenoid the current passes to ground and back to the battery. The momentary energization of the solenoid is sufficient to activate the washer 5 as is fully described in the above mentioned application Serial No. 323,902, now Patent No. 2,746,652.

Figure 3:
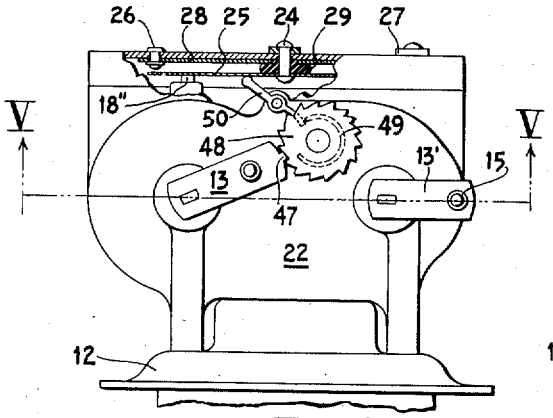
Fig. 3 is a front elevational view of the wiper motor, partly broken away in order to show the flutter switch mechanism.
Figure 4:
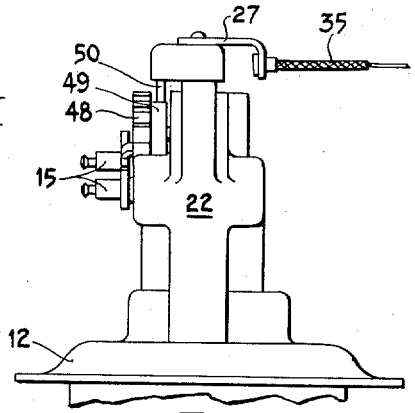
Fig. 4 is a side elevational view of the motor.

If the wipers are already in use, activation of the washer will not affect wiper operation as the above described wiper and washer circuits are connected in parallel. However, if the wipers are not being utilized, bus bars 37 and 38 will be in the position shown in phantom in Fig. 9, and the momentary closure of switch 42 will complete a circuit to the motor causing it to commence operation. This circuit commences at the battery and follows the above described path to the coordinator control switch 42. From conductor 46 the current enters lead 34' and flows into the motor via lead 34. From the motor the current goes to ground and back to battery 39. As the motor "kicks over," the coordinator mechanism is activated. Pawl 47 on the crank arm 13 rotates timing gear 48 one tooth length as is best seen in Fig. 3. This incremental rotation of the gear is sufficient to cause split collar 49 to engage lever 50, rotating the latter in a clockwise direction until its inturned lower end rides up on the surface of the collar. From Figs. 3, 5, and 6 it may be seen that the upper end of lever 50 projects through a slot 51 in housing 22 with its outstanding arm 53 in contact with flutter bar 25. As the lever is rotated by the collar, the arm forces the flutter bar upward into engagement with contact 26. Therefore, substantially concurrently with the opening of switch 42 and the resultant breaking of its motor circuit, a parallel motor circuit is completed by the flutter bar. With the flutter bar engaging contact 26, the current will flow to the motor via the previously described parking circuit, and will continue to flow for so long as the flutter bar is held against the contact.

Since the two squeegees simultaneously return to their parked positions with every fourth rotation of gear 18, the number of teeth on timing gear 48 must be a multiple of four, with exactly four teeth subtended by the gap in collar 49. In the illustrated embodiment, the timing gear has sixteen teeth. With the squeegee in parked position, the pawl is engaged by the first tooth, and the inturned end of arm 50 abuts the leading edge of collar 49. As crank arm 13 makes its first rotation, it moves the timing gear one tooth length causing the lever to rotate and ride up on the collar. The crank arm continues to turn the timing gear one tooth length with each rotation until the twelfth. At that time the squeegees are again in parked position and lever 50 is poised at the trailing edge of the collar. As the crank arm makes its thirteenth rotation, the lever drops off the trailing edge of the collar and releases the flutter bar. Concurrently however, either or both of followers 17'' and 18'' have [riden] *ridden* up on the high portions of their respective cams so as to maintain the flutter switch closed. At the end of the sixteenth rotation the squeegees will again be in their parked position and the followers will both be on the low portion of their cams, permitting the flutter switch to open and break the motor circuit. Pawl 47 will again be in engagement with the first tooth of the timing gear and the lever will be abutting the leading edge of the collar, ready for the commencement of the next windshield cleaning cycle. As the length of time during which the wipers will operate in each cleaning cycle is determined by the number of teeth on the timing gear, while the fluid delivery time of the washer is substantially constant, the length of time which the wipers will continue to operate after the cessation of fluid flow may be adjusted by merely increasing or decreasing the number of teeth on the timing gear by multiples of four.

*From the foregoing it will be clear that the present invention provides a coordinated electric windshield cleaner and washer system embodying automatic coordinating means that includes a timing mechanism for supporting conjoint operation for an interval of time, and control switch means comprising two electric circuits closable for initiating the conjoint action, and one of these circuits being operable selectively for independent control of the wiper motor.*

Figure 2:
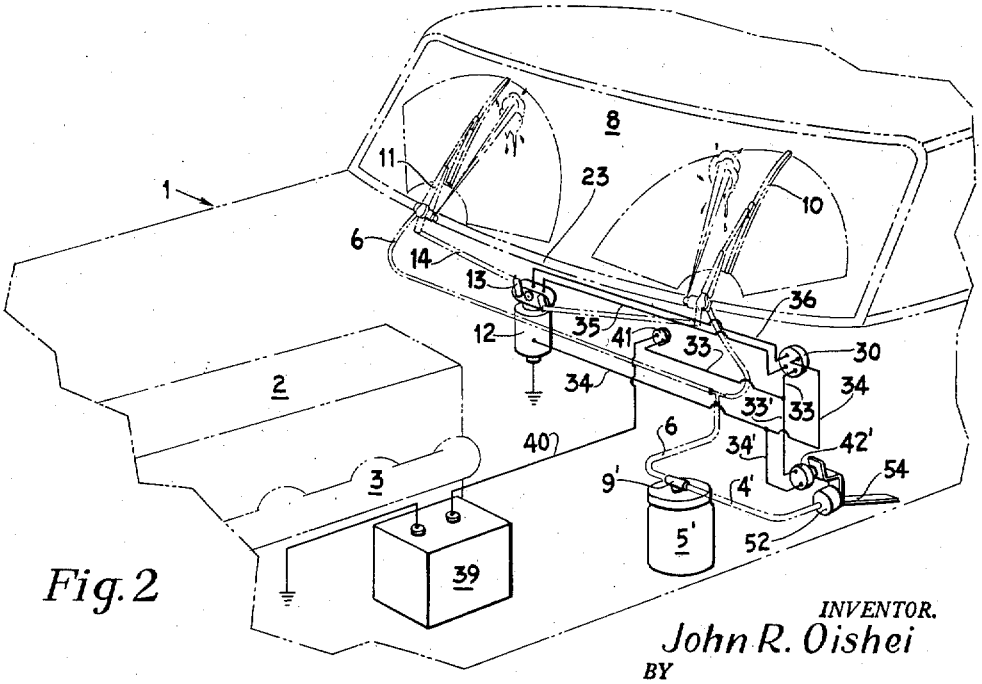
Fig. 2 shows the coordinator system modified for use in conjunction with a washer which employs pneumatic power exclusively.

In the modification illustrated in Fig. 2, a fluid pressure type washer 5' is utilized. In this embodiment, when the operator desires to utilize the washer he depresses coordinator control pedal 54, forcing bellows 52 to collapse and simultaneously closing switch 42' so as to activate the motor circuit. When the pedal is released, the bellows returns to its normal position, sucking fluid thereinto via conduit 4'. The next time the pedal is depressed the fluid is forced out of the bellows and delivered to the windshield via conduit 4', T valve 9' and conduit 6. As the bellows returns to its normal position, it again sucks fluid out of washer 5' and is as a result fully primed and ready for the next cleaning cycle. For a more detailed discussion of the operation and construction of the washer resort may be had to application Serial No. 315,175, filed on October 16, 1952, by George O. Bartoo for a Windshield Washer, now Patent No. 2,717,556, issued September 13, 1955. The method by which the wiper action is coordinated with that of the washer is substantially the same as that disclosed above relative to the embodiment of Fig. 1 except that lead 45 is disconnected from switch 42' since such lead is necessary only when the washer is activated by electromagnetic means. In the embodiment of Fig. 2, switch 42' is therefore merely a manually selective by-pass for the wiper motor.

It may therefore be seen that by merely depressing the coordinator control the complete windshield cleaning cycle will be carried out with no further attention from the operator being required. Additionally, since the duration of the cycle is solely determined by the number of strokes or oscillations of the squeegee, uniform results will be obtained regardless of the operating conditions to which the vehicle is being subjected at the time the cycle is instituted.

Having thus disclosed exemplary embodiments thereof, what I claim as my invention is:

1. A windshield cleaning system for an automotive vehicle comprising, a wiper motor having a rotatable element, a washer unit operable to deliver a predetermined quantity of liquid solvent to a windshield, control means operable to activate said washer unit and simultaneously start said wiper motor, and an automatically operable coordinator mechanism activated in response to operation of said control means and including timing means operatively associated with said rotatable element for maintaining said wiper motor active for a predetermined number of rotations of said rotatable element.

2. A windshield cleaning system for an automotive vehicle comprising, a squeegee, a wiper motor having a rotatable element, said element being operatively connected to said squeegee so as to oscillate the latter to and fro across an associated windshield, a washer unit operable to deliver a predetermined quantity of liquid solvent to the windshield, control means operable to activate said washer unit and simultaneously start said wiper motor, an automatic coordinator mechanism responsive to operation of said control means for maintaining said wiper motor active for a predetermined number of oscillations of said squeegee, and additional means operatively associated with said coordinator mechanism and responsive to oscillation of said squeegee to automatically park said squeegee only after said predetermined number of oscillations.

3. A windshield cleaning system for an automotive vehicle comprising, a squeegee, a wiper motor having a rotatable element, said element being operatively connected to said squeegee so as to oscillate the latter to and fro across an associated windshield, a washer unit operable to deliver a predetermined quantity of liquid solvent to the windshield, control means having an "on" position and an "off" position, said control means being operable to activate said washer unit and simultaneously start said wiper motor when in its "on" position and timing means controlled by oscillation of said squeegee and automatically operable to maintain said wiper motor operative for a predetermined number of oscillations of said squeegee after said control means has returned to its "off" position and then to park said squeegee.

4. A windshield cleaning system for an automotive vehicle comprising, a wiper mechanism including an electric motor and a rotatable element, a washer mechanism operable to deliver a quantity of liquid solvent to a windshield, control switch means operable to activate said wiper mechanism and said washer mechanism, and an automatically operable coordinating mechanism activated in response to operation of said control switch means for conjoint operation of the wiper and the washer, and including timing means embodying an electrical element operatively associated with said rotatable element for providing a predetermined period of conjoint operation.

5. A windshield cleaning system for an automotive vehicle, comprising a wiping mechanism including a wiper with an electric motor and a rotatable member interconnecting said wiper and motor, a washer mechanism including a pump for delivering a liquid solvent to an associated windshield, control switch means operable to activate both mechanisms, and automatic coordinating means activated in response to the operation of said control switch means and including a timing mechanism embodying an electrical unit for supporting an interval of conjoint operation of the wiper and washer, said control switch means comprising two electric circuits for cooperatively initiating the conjoint wiper and washer operation, one of said circuits being operable selectively for independent control of the wiper motor.

6. A windshield cleaning system for an automotive vehicle, comprising a wiper mechanism having an electric motor, an electrically responsive washer mechanism operable to deliver a liquid solvent to an associated windshield, control switch means operable to jointly activate said wiper and washer mechanisms, and an automatic coordinating mechanism activated in response to operation of said control switch means and including a timing mechanism embodying electrical means for providing an interval of conjoint operation of the wiper and washer, said control switch means serving for the independent control of the wiper motor.

7. A windshield cleaning system for an automotive vehicle comprising, an electric wiper mechanism including a motor, an electrically responsive washer mechanism operable to deliver a quantity of liquid solvent to a windshield, control switch means operable to jointly activate said wiper and washer mechanisms and an automatically operable coordinating mechanism activated in response to operation of said control switch means and including a timing mechanism embodying electrical means for providing a predetermined interval of conjoint operation of the wiper and washer, said control switch means comprising two electric circuits for initiating the conjoint wiper and washer operation, one of said circuits being operable selectively for independent control of the wiper motor.

References Cited in the file of this patent or the original patent

UNITED STATES PATENTS

| | | |
|---|---|---|
| 2,013,200 | Conway | Sept. 3, 1935 |
| 2,162,985 | West | June 20, 1939 |
| 2,206,814 | Horton | July 2, 1940 |
| 2,298,197 | Coffey | Oct. 6, 1942 |
| 2,502,180 | Smulski | Mar. 28, 1950 |
| 2,743,473 | Oishei | May 1, 1956 |
| 2,816,316 | Oishei | Dec. 17, 1957 |